(12) United States Patent
Westrick, Jr. et al.

(10) Patent No.: US 8,214,061 B2
(45) Date of Patent: Jul. 3, 2012

(54) DISTRIBUTED INTELLIGENCE AUTOMATED LIGHTING SYSTEMS AND METHODS

(75) Inventors: Rich L. Westrick, Jr., Social Circle, GA (US); Stephen H. Lydecker, Snellville, GA (US); Mark Norton, Covington, GA (US)

(73) Assignee: ABL IP Holding LLC, Conyers, GA (US)

( * ) Notice: Subject to any disclaimer, the term of this patent is extended or adjusted under 35 U.S.C. 154(b) by 882 days.

(21) Appl. No.: 11/753,902

(22) Filed: May 25, 2007

(65) Prior Publication Data

US 2007/0273307 A1 Nov. 29, 2007

Related U.S. Application Data

(60) Provisional application No. 60/808,847, filed on May 26, 2006, provisional application No. 60/808,848, filed on May 26, 2006.

(51) Int. Cl.
G05B 15/02 (2006.01)
H05B 39/00 (2006.01)

(52) U.S. Cl. ............... 700/9; 700/20; 700/275; 315/312

(58) Field of Classification Search ................ 700/9, 11, 700/12, 14–20, 23, 24, 27, 28, 275; 315/312–315, 315/317, 318, 323–325
See application file for complete search history.

(56) References Cited

U.S. PATENT DOCUMENTS

| | | | |
|---|---|---|---|
| 4,422,018 A | 12/1983 | Bailey | |
| 4,461,977 A | 7/1984 | Pierpoint et al. | |
| 4,587,417 A * | 5/1986 | Duve et al. | 315/360 |
| 4,631,675 A | 12/1986 | Jacobsen et al. | |
| 5,177,461 A | 1/1993 | Budzyna et al. | |
| 5,209,560 A | 5/1993 | Taylor et al. | |
| 5,668,446 A * | 9/1997 | Baker | 315/294 |
| 5,757,145 A * | 5/1998 | Johnson et al. | 315/308 |
| 5,882,107 A | 3/1999 | Bornhorst et al. | |
| 5,962,989 A * | 10/1999 | Baker | 315/294 |
| 6,046,550 A * | 4/2000 | Ference et al. | 315/291 |
| 6,114,632 A | 9/2000 | Planas, Sr. et al. | |
| RE37,135 E * | 4/2001 | Elwell | 315/154 |
| 6,657,398 B2 | 12/2003 | Chang | |
| 6,761,470 B2 | 7/2004 | Sid | |
| 6,813,525 B2 | 11/2004 | Reid et al. | |
| 6,859,644 B2 * | 2/2005 | Wang | 455/159.2 |

(Continued)

FOREIGN PATENT DOCUMENTS

EP 0 774 616 5/1997

(Continued)

*Primary Examiner* — Charles Kasenge
(74) *Attorney, Agent, or Firm* — Ballard Spahr LLP

(57) ABSTRACT

A distributed intelligence lighting system is comprised of a global controller, one or more local controllers, wall stations, sensors and lighting fixtures. In one aspect, the lighting system provides schedule-based, occupancy-based, and/or daylight-responsive automated control and multi-level or ON/OFF manual control of lighting loads. System components communicate over a topology-free and polarity-free modular low voltage digital network that combines power and control wiring in an easily installed labeled and keyed cable. Embodiments according to the system do not require any components to be addressed, manually configured, or programmed (beyond setting the project location and current time and date) for energy code compliance. Manual and after-hours override control is accomplished via local low voltage wall stations or occupancy sensors. Global controllers generally each incorporate an onboard modem and user interface with LCD display, both permitting programming of advanced features, override, system monitoring, and diagnostics.

34 Claims, 7 Drawing Sheets

U.S. PATENT DOCUMENTS

| | | | |
|---|---|---|---|
| 6,888,315 B1 | 5/2005 | Hsiao | |
| 6,888,472 B2 * | 5/2005 | Yoshimura et al. | 340/825.22 |
| 6,990,394 B2 * | 1/2006 | Pasternak | 700/295 |
| 6,998,538 B1 | 2/2006 | Fetterolf, Sr. et al. | |
| 7,045,968 B1 * | 5/2006 | Bierman et al. | 315/244 |
| 7,109,668 B2 * | 9/2006 | Pogodayev et al. | 315/307 |
| 7,111,952 B2 * | 9/2006 | Veskovic | 362/1 |
| 7,148,632 B2 | 12/2006 | Berman et al. | |
| 7,167,777 B2 * | 1/2007 | Budike, Jr. | 700/297 |
| 7,346,433 B2 * | 3/2008 | Budike, Jr. | 700/277 |
| 7,369,060 B2 * | 5/2008 | Veskovic et al. | 340/4.3 |
| 2002/0037054 A1 | 3/2002 | Schurig | |
| 2004/0105264 A1 | 6/2004 | Spero | |
| 2004/0201448 A1 * | 10/2004 | Wang | 340/3.43 |
| 2004/0260427 A1 * | 12/2004 | Wimsatt | 700/275 |
| 2005/0073838 A1 | 4/2005 | Haugaard et al. | |
| 2005/0110416 A1 * | 5/2005 | Veskovic | 315/149 |
| 2006/0002110 A1 | 1/2006 | Dowling et al. | |
| 2006/0044152 A1 * | 3/2006 | Wang | 340/825 |
| 2006/0049935 A1 * | 3/2006 | Giannopoulos et al. | 340/533 |
| 2006/0076908 A1 | 4/2006 | Morgan et al. | |
| 2006/0193125 A1 | 8/2006 | Fluss | |
| 2006/0193133 A1 | 8/2006 | Brelie | |
| 2006/0198128 A1 | 9/2006 | Piepgras et al. | |

FOREIGN PATENT DOCUMENTS

| | | |
|---|---|---|
| EP | 0 940 061 | 9/1999 |
| WO | WO/92/05615 | 4/1992 |
| WO | WO/92/05616 | 4/1992 |
| WO | WO/97/43876 | 11/1997 |
| WO | WO/2004/094896 | 11/2004 |
| WO | WO/2006/031753 | 3/2006 |
| WO | WO/2006/081186 | 8/2006 |
| WO | WO/2006/093889 | 9/2006 |

* cited by examiner

DISTRIBUTED INTELLIGENCE AUTOMATED LIGHTING SYSTEMS AND METHODS

CROSS REFERENCE TO RELATED APPLICATIONS

This application claims benefit of and priority to U.S. Provisional Patent Application Ser. No. 60/808,847, filed May 26, 2006, and U.S. Provisional Patent Application Ser. No. 60/808,848 filed May 26, 2006, which applications are hereby incorporated by this reference in their entireties.

BACKGROUND

1. Field of the Invention

This invention relates generally to lighting systems and in particular to automated lighting systems and methods incorporating distributed intelligence.

2. Background

Automated lighting control systems are used in commercial and industrial buildings to provide a central control for lights, which may be grouped in one or more zones, in order to save energy and money by controlling power to the various zones at predetermined time periods. More sophisticated systems also allow additional flexibility, including adjusting the level of lighting, providing override switches or other controls in the area of the zone, or using sensors to determine whether individuals are present in a zone.

Traditionally, in such lighting installations as described above, any intelligence is concentrated at a centralized control panel. This centralization of the control scheme requires a "home run" wiring from each zone within a building to the centralized control panel. This is further complicated by the National Electrical Code (NEC), NFPA-70, general requirement that line voltage, which provides power to the lighting fixtures and ancillary equipment, must be kept separate from low-voltage control wiring. Furthermore, wall controllers and sensors, such as occupancy sensors and photocells are also wired back to the central panel. Once installed, elements and devices that comprise the lighting system must be assigned and programmed.

Therefore, what is needed is automated lighting systems and methods that overcome challenges found in the art, some of which are described above.

SUMMARY

Embodiments according to the present invention provide a distributed intelligence automated lighting system and methods of operating. In various aspects, a modular wiring system can be used for carrying both power and digital control signals for use with automated lighting control systems. Digital control signals enable the automated lighting control systems to provide advanced features and flexibility incorporating substantially all aspects of an automated lighting control system: a lighting controller, override switches, wall stations, sensors, and the lighting fixtures. Further described herein are control schemes to allow user functionality desired in an automated lighting control system, such as distributed intelligent devices that provide multiple zone and multiple circuit control, group or master control, cascading of control devices and integration of normal/emergency and battery charging circuits.

In accordance with the purposes of this invention, as embodied and broadly described herein, this invention, in one aspect, relates to a distributed intelligence lighting system comprising a power supply; a global controller having a processor and operably connected to a global bus; a first local controller having a processor, wherein the first local controller is operably connected to the global bus and is operably connected to a local bus; one or more lighting fixtures operably connected to the local bus, wherein the one or more lighting fixtures have ballasts configured to operate in accordance with DALI protocol and the one or more lighting fixtures are at least controlled by control signals from the first local controller; one or more sensors operably connected with the first local controller; one or more wall stations operably connected with the local bus, wherein the one or more wall stations are configured to adjust a scene setting of the one or more lighting fixtures operably connected to the local bus in accordance with the DALI protocol and to override automated control of the one or more lighting fixtures; and modular wiring comprised of power and control wiring in interlocking sections, wherein the modular wiring is used to form the global bus and the local bus and to operably connect the power supply and the global controller with the first local controller, the one or more lighting fixtures, the one or more sensors and the one or more wall stations. The global controller provides control signals to the first local controller through that global bus that place the first local controller in an operational state, and the first local controller operates the one or more fixtures in accordance with one or more of the control signals received from the global controller, from signals received from the one or more sensors, and from inputs received from the one or more wall stations.

In another aspect, the invention relates to a method of operating a distributed intelligence lighting system. The method comprises providing global control signals from a global controller to one or more first local controllers through a global bus; receiving by the one or more first local controllers the global control signals and sensor signals from one or more sensors operably connected with the one or more first local controllers; controlling by the one or more first local controllers of one or more of respective at least one lighting fixture having a ballast configured to operate in accordance with DALI protocol and one or more respective second local controllers, wherein the respective at least one lighting fixture and the one or more respective second local controllers are operably connected with the one or more first local controllers via a local bus. The global bus and the local bus are comprised of modular wiring comprised of power and control wiring in interlocking sections, said modular wiring is used to operably connect a power supply and the global controller with the one or more first local controllers and to operably connect the one or more first local controllers with the respective at least one lighting fixture, the one or more sensors and the one or more respective second local controllers. The global control signals comprise control signals that place the one or more first local controllers in an operational state, and the one or more first local controllers operate the respective at least one lighting fixture in accordance with one or more of the global control signals received from the global controller and from sensor signals received from the one or more sensors.

In yet another aspect, the invention relates to a modular lighting control system for at least one zone of lighting, wherein each said zone of lighting comprises at least one light fixture. The modular lighting control system comprises a power supply; a global controller for controlling at least one zone of lighting with global digital signals; a converter, having as inputs power from the power supply and global digital signals from the global controller, connected at its output to a modular cable carrying both signal and power wires, wherein the converter directs the global digital signal input to the signal wire in the modular cable, and the power supply input to the power wire in the modular cable; a local controller, connected at its input to the modular cable and having as inputs the global digital signals and sensor signals from one or more sensors and connected at its outputs to the modular cable, wherein the local controller is configured to control the at least one light fixture with local digital signals in accordance with the global digital signals and the sensor signals; an override switch that is configured to send digital signals to the at least one light fixture and override the local digital signals; and a tee-connector for connecting the override switch to the modular cable. The modular cable connects to the at least one light fixture to provide power and to control the operation of the at least one light fixture.

In yet another aspect, the invention relates to an adaptive lighting control system. The adaptive control system comprises a power supply or power control equipment to supply power to at least one zone of lighting, wherein each zone of lighting comprises at least one light fixture; a timing device such as, for example, a timeclock; at least one local controller or wall switch associated with each zone of lighting; a global controller in communication with each local controller and the timeclock, wherein the global controller includes program means that direct the at least one local controller to: associate a time-out period with each zone, which time-out period is restarted each time a light control is activated; associate two states with each zone with associated start and stop times on the timeclock, wherein: in the first state the local controller turns on the lights in a zone when a light control associated with the zone is activated, and turns off the lights in the zone either when the light control in the zone is deactivated or when the stop time for the first state occurs, and in the second state the local controller turns on the lights in a zone when a light control associated with the zone is activated, and turns out the lights in the zone either when the light control in the zone is deactivated or when the time-out period associated with that zone expires; and adjusts the start and stop times associated with the two states for a zone based on activation of the light controls associated with the zone.

In another aspect, the invention relates to a method of signaling to occupants that an automatically controlled lighting system, which includes adjustable light levels from fully off to fully powered, is about to turn off the lights, wherein the method comprises the steps of determining the present light level of the lights to be turned off; and cycling the light level from the present light level to the fully powered level, then to the fully off level or a lower level that is not off, and then back to the previously determined present level.

Additional advantages of the invention will be set forth in part in the description which follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, not drawn to scale, which are incorporated in and constitute a part of this specification, illustrate embodiments according to the present invention and together with the description, serve to explain the principles of the invention.

DETAILED DESCRIPTION

Figure 1:
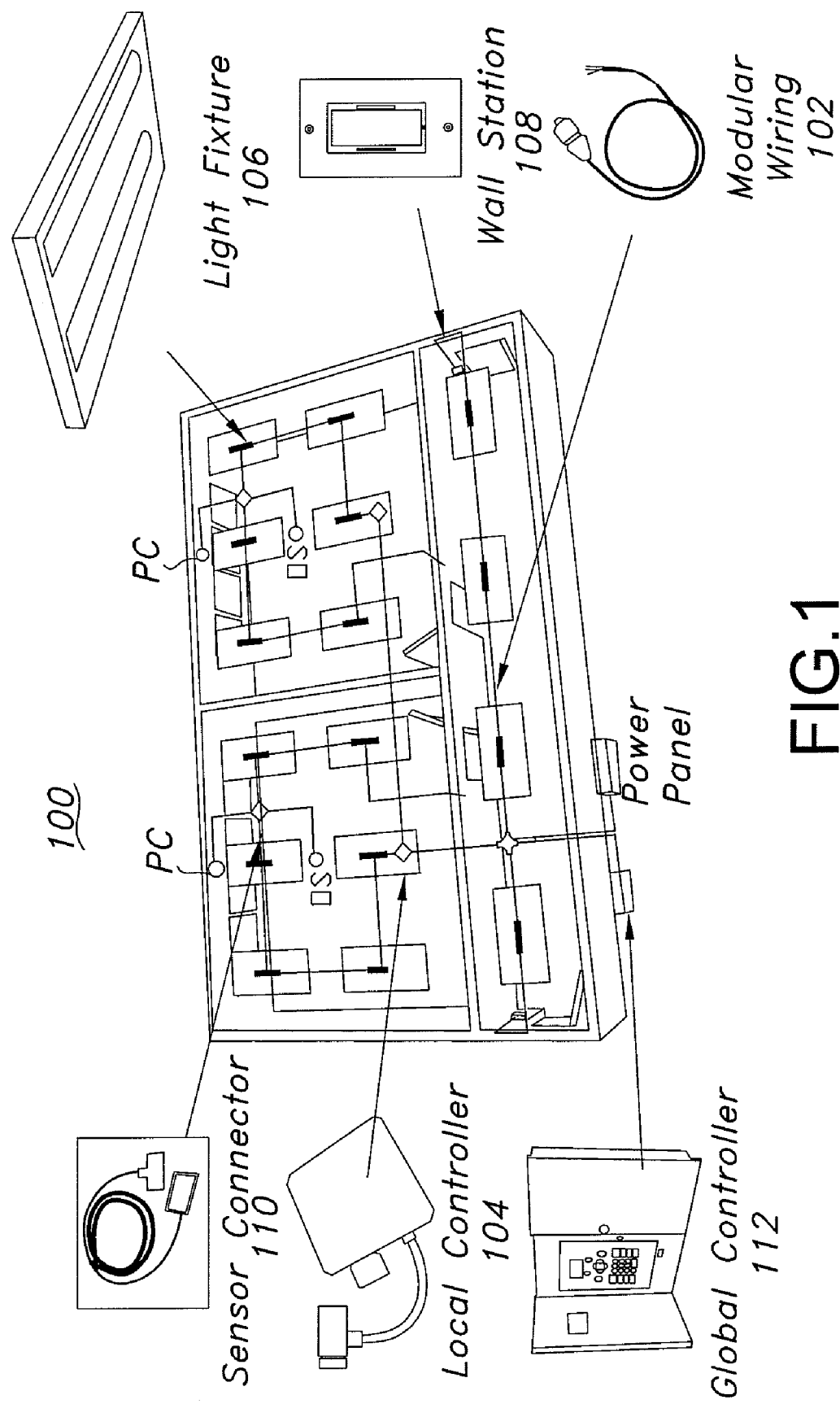
FIG. 1 is an overview illustration of an exemplary system of an embodiment according to the present invention.

Embodiments according to the present invention may be understood more readily by reference to the following detailed description and the examples included therein and to the figures and their previous and following description.

Before the present articles, devices, systems and/or methods are disclosed and described, it is to be understood that this invention is not limited to specific methods, specific devices or to particular systems, as such may, of course, vary. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Thus, for example, reference to a local controller includes two or more such controllers, and the like.

Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

In this specification and in the claims which follow, reference will be made to a number of terms which shall be defined to have the following meanings:

"Optional" or "optionally" means that the subsequently described event or circumstance may or may not occur, and that the description includes instances where said event or circumstance occurs and instances where it does not.

Reference will now be made in detail to the present embodiments of the invention, examples of which are illustrated in the accompanying drawings. Wherever possible, the same reference numbers are used throughout the drawings to refer to the same or like parts.

Overview

Embodiments according to the present invention utilize a communication protocol based on the DALI standard, as is known in the art, for controlling fixtures and devices that comprise lighting systems according to aspects of the present invention. DALI is an acronym for Digital Addressable Lighting Interface and is a protocol set out in the technical standard International Electrotechnical Commission (IEC) 60929, which is fully incorporated herein by reference and made a part hereof. DALI is a dedicated protocol for lighting control. DALI products include electronic ballasts, lighting control equipment, converters and interfaces, and auxiliary equipment.

Briefly, DALI functionality includes individual control of lighting fixtures and devices that comprise an automated lighting system. Because each unit in a DALI network has its own individual address, it is possible to communicate directly to the components in the fixtures. Individual addressability provides multi-channeling use, which makes it possible for only one pair of control cables to control several different groups of fittings. Because DALI devices can be switched by commands coming directly from the DALI control system, switching of the power circuit may be unnecessary. DALI allows back-channeling whereby the information flow is bidirectional with the DALI system. Instead of only giving commands about the light level to the device, the DALI system enables also information feedback on the condition of the device including whether the light is switched on or off, the preset light level, and the ballast condition. DALI allows simple control wiring, the cabling comprises only a two wire cable, independent of any wiring topology between the units in the system. DALI also facilitates re-configuration and expansion. Once the system is installed and configured it is possible to change the functioning of the system without rewiring by changing the programming. If the lighting system needs to be expanded, new components can be added anywhere in the DALI system within the limits of the DALI standard, no wiring configuration rules apply on the DALI line in this aspect.

The DALI standard limits the total number of ballasts on a bus to 64 and requires that each ballast be individually addressed. In currently offered DALI systems on the market, all control devices, such as wall stations and sensors, must be manually programmed before they will control any ballasts. The DALI protocol also includes no prioritization scheme: all controls on a buss have equal ability to control the fixtures. This limitation precludes the use of this technology in many applications which require multiple levels of control for the same lights, including manual control, automatic daylight responsive control, and automatic occupancy-based control.

Embodiments according to the present invention provide for DALI protocol-based controls configured to operate devices that comprise an automated lighting system in a tiered fashion, which allows the system to be highly flexible and scalable. Further, in aspects described herein, much of the node addressing and manual configuration required by traditional DALI or other lighting control systems has been automated to lower installed cost and speed installation.

FIG. 1 is an overview illustration of an exemplary system 100 of an embodiment according to the present invention. In FIG. 1, the exemplary system 100 is comprised of one or more global buses that are used to operably connect one or more local buses together. In one aspect, the devices that comprise the global buses and the local buses are interconnected by modular wiring 102 that is a combination of power and control wiring and is described in greater detail herein. It is to be appreciated, however, that control of the various devices that comprise the system can be performed through a network comprised of wired, wireless, or optical components, or combinations thereof. Each local bus is further comprised of a local controller 104 and a bus power supply, as required by the DALI protocol. The local controller 104 further comprises an input port that allows the local controller 104 to send and receive messages on the global bus. The local controller 104 can control a single zone of lights 106 or other devices (where a zone is a group of lights that are always controlled together), although other embodiments could use local controllers that are configured to control multiple zones, either through multiple local bus outputs or an addressing scheme on a single local bus output.

The local controller 104 coordinates local controls, such as wall stations 108 and sensors (e.g., occupancy sensors (OS) and daylight sensors/photocells (PC)), with global controls, such as time of day scheduling and load shed requests. The local controller 104 also can poll local ballasts and control devices for status and diagnostic information, format or aggregate this data, and send data (aggregate or otherwise) to a global controller 112.

In one aspect, the local controllers 104 are assigned to one of several available configuration groups, where a configuration group is a set of local controllers that all share the same configuration data, such as time schedules or sensor settings. The configuration group for a given room is set via the local wall station, and any room can be a set to be a member of any configuration group, regardless of which global bus(es) or power circuit(s) the devices in the room are wired.

The one or more global buses are operably connected with the global controller 112. The global controller 112 allows a user to input new configuration data (such as a new time schedule), and then it broadcasts or pushes this data out to the one or more local controllers 104 operably connected to the global controller 112 via the DALI protocol on the global bus. Each local controller 104 is configured to determine whether the broadcast data is for their configuration group and, if so, receives and implements the changes. If the data is for a different configuration group, it is ignored. Global prioritized override commands can be sent in a similar fashion, providing, for example, active shedding of the lighting load, centralized override of large areas, override for fire and burglar alarms, etc.

Local controllers 104 generally operate autonomously. This means that once a new configuration or override command is received by a local controller 104 from the global buss, the local controller executes it and all local user interface and sensor functions will operate normally even if no other commands are received from the global controller.

Control devices such as, for example, wall stations 108, photo sensors (PC), occupancy sensors (OC), etc., operate on the local bus work by sending either DALI scene or arc level commands to the local controller 104, which then evaluates the new level and its source and either sends the level as-is to the lighting ballasts operably connected with the local controller 104, calculates a new level to send to the ballasts, or does not send an updated level to the ballasts depending on what other control devices are currently online or commands are active. If the local controller 104 is off line for some reason, such as, for example, a component failure on the circuit board, then the local control devices will enter a stand alone mode and send levels directly to the ballasts.

The control structure is such that some input types can have priority over other inputs. Prioritized inputs include, for example, fire or burglar alarm inputs. Some input types will factor into the operations performed by a local controller 104. For example, a connected photo sensor will cause the local controller 104 to use the photo sensor input to continuously calculate new ballast levels to maintain the light level in the room based on the current wall station level, the sensed absolute light level, and the calculated contribution of the artificial lighting. In some instances, manual input types (e.g., wall stations) or automatic input types (e.g., occupancy sensor) are factored by other inputs or may be overridden by prioritized inputs (e.g., fire alarms or burglar alarms).

In one aspect, local controllers 104 can be cascaded. In such an embodiment, a downstream (e.g., second) local controller is connected via its global bus input to the local bus of an upstream (e.g., first) controller in order to serve rooms with more than one control zone. This allows some inputs to be configured as master inputs to control all zones within a room without affecting other zones or rooms in the building. When connected in this fashion, the local controllers 104 sense each other, and the first controller (the local controller operably connected to the global bus) will pass global commands on to the other downstream controllers connected on its local bus, and subsequent downstream controllers (connected to the first local controller's local bus) will pass master input commands back upstream to the first controller. A plurality of local controllers can be cascaded in this fashion, and global commands are passed from one to the next until the last one in the chain is reached, and local master commands are passed both upstream and downstream until all controllers have been reached. When connected in this fashion, status and diagnostic data is passed from local controller to local controller upstream until the controller connected to the global bus (the first controller) is reached, at which time it is sent to the global controller 112.

Global Controller

As provided above, the one or more global buses are operably connected with the global controller 112. The global controller 112 allows a user to input new configuration data (such as a new time schedule), and then it broadcasts or pushes this data out to the one or more local controllers 104 operably connected to the global controller 112 via the DALI protocol on the global bus. The global controller, also known as a light energy manager, can be configured to support a plurality of configurations. For example, in one instance a global controller can support up to eight independent configurations. A user can program unique schedules and settings for each configuration. Each room may then be assigned to one of the configurations via the local wall station so that no knowledge of installation details (such as data wiring or power circuiting) is required for configuration. Other settings can also be configured via the global controller including occupancy sensor behavior for a zone such as, for example, manual on/automatic off, automatic on/automatic off, setting lights to a minimum or lowered level when no motion is detected during scheduled on times and to off when no motion is detected during scheduled off times; wall stations, photocells and occupancy sensors in a zone can be disabled by schedule; and time schedules can be temporarily suspended for certain time periods (e.g., 1, 2, 4, 8, 12, or 24 hours) to accommodate special events, and at the end of the suspension period the system automatically reverts to the normal schedules.

Furthermore, the global controller can be programmed for occupancy period scheduling. In one aspect, the system supports both fully adaptive and manually programmed time-of-day schedules. With adaptive scheduling, the system has the ability to automatically adapt a timeclock schedule to the actual use of each room in the space without requiring the use of occupancy sensors or manual programming of the system beyond setting the project location. With manual scheduling, the system has the ability to have schedules manually programmed if desired. When manual scheduling, the system supports a plurality of independent schedules which may be programmed with events such as ON, OFF, and cancel switch timeouts. Switch timeouts occur when during periods designated as unoccupied, an override occur such as by a wall station or an occupancy sensor, then the system will turn off the lights after a designated period (e.g., two hours) if there is no activity. In manual control, switch timeouts are controlled via global signals. If in adaptive control, they are controlled via local control signals from a local controller. Scheduled events can be programmed to occur at a fixed time of the day or at calculated sunrise and sunset times. It is also possible to schedule an event to occur a certain time period (e.g., up to 120 minutes) before or after sunrise or sunset. Scheduled events can be programmed to occur on individual or multiple days of the week facilitating a rotating Monday through Sunday weekly operating scenario. Scheduled events can also be assigned to occur on a holiday. Holiday events automatically supersede assigned weekday schedules based on a list of holiday dates. Holiday dates may be programmed to reoccur automatically each year or only on a specific year.

For both schedule types (adaptive and manual), OFF events can be preceded by a warning sequence to warn the occupants of the impending off event. For example, and as further described herein, the warning sequence can involve dimming the lights to a minimum level, then to a maximum level of brightness, then returning them to their previous level. Alternatively, the warning sequence can involve turning non-dim loads off and then back on again. The warning sequence feature can be different or turned off on a zone by zone basis if desired.

The global controller can support a dedicated load shed schedule which allows the shedding of the lighting load on a time-of-day basis. When in effect, in one embodiment, the load shed event proportionally subtracts the programmed amount (load shed percentage) from the current occupant-set or schedule-set level. All other occupant and system controls remain operational during a load-shedding period, but the actual level of the lights is at the set level minus the load shed percentage.

In one embodiment, the global controller is provided with a plurality of network connections, including a lighting control network, a BACnet/IP over 10/100base-T Ethernet with two ports and integral switch, EIA RS-485 port for connection to up to 16 SYRS series digital remote stations, and an EIA RS-232 port, though it is to be appreciated that more or fewer or different arrangements and types of network connections are contemplated within the scope of this invention, including wireless and optical connections. In one aspects, the global controller further comprises an onboard modem (wired or wireless) for remote monitoring, override and programming of the system. Further comprising the global controller in one aspect are low voltage inputs such as one or more dry contacts that are programmable to accept maintained, momentary, normally open, or normally closed contacts and analog inputs such as one or more 3-wire, 0-10V analog inputs with 24VDC supply compatible with series photocells.

Global Controller Programming Guide

As indicated above, the global controller is programmable, though generally, the default is for the system to automatically determine a setting, if possible. However, a user has the ability to override the automatic settings if desired. For instance, time and date generally is set first, though if the global controller is connected to Internet via Ethernet network, time and date can be set automatically via SNTP. Further, location is programmed into the system (used for sunrise and sunset calculations as well as time zone considerations).

Generally, the location is set via city and state (default), or the user may define a custom location by manually entering a longitude and latitude.

Figure 2:
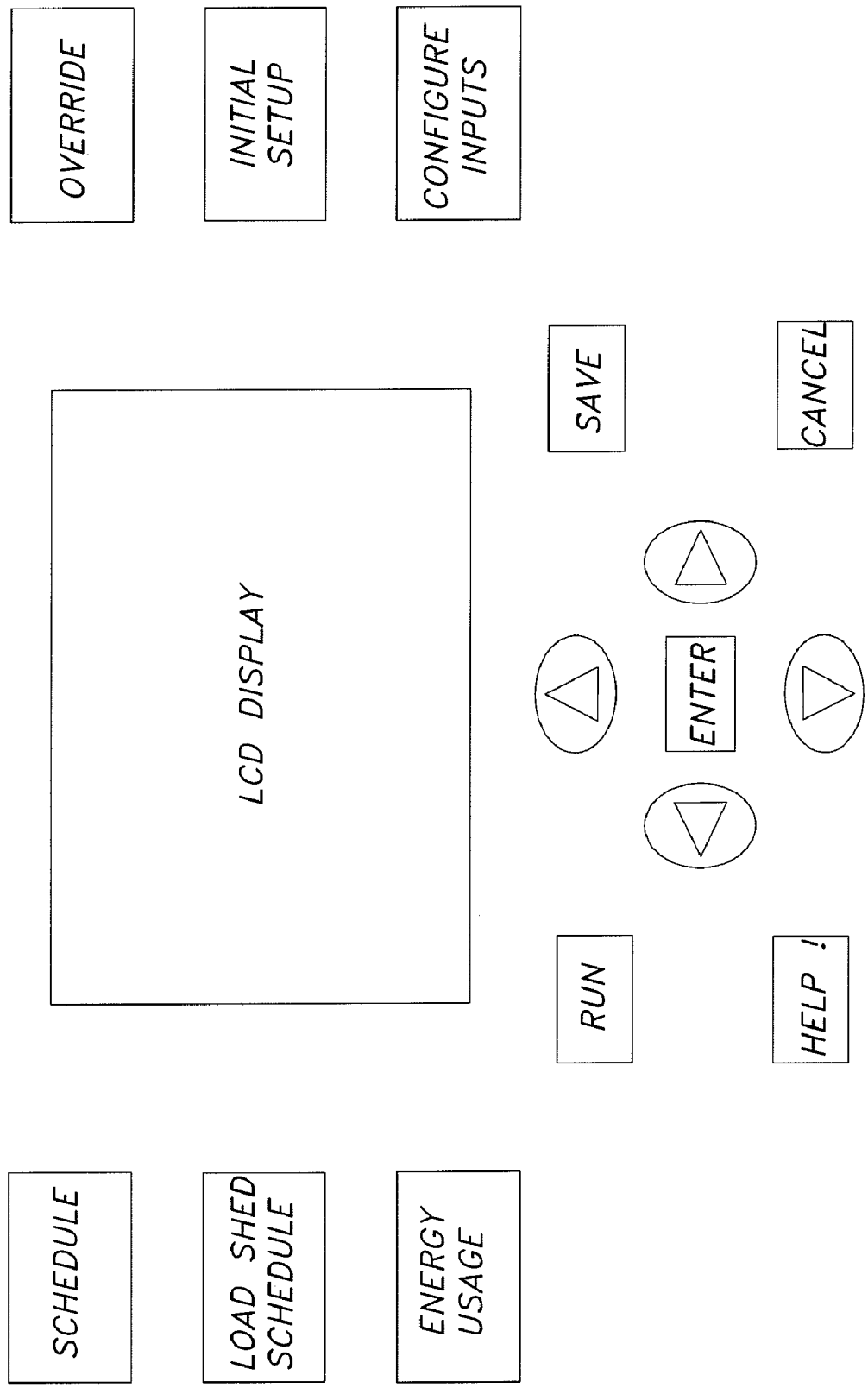
FIG. 2 is an exemplary user interface for interacting with a global controller to facilitate programming, operation and diagnostics.

In one aspect, the global controller is provided with a user interface as shown in FIG. 2 to facilitate programming, operation and diagnostics.

As indicated above, a user can define a plurality (e.g., up to 8) unique areas that can be configured differently for on/off schedules, masking schedules, load shed behavior, and controlled separately via central overrides. The user has the ability to define a custom name for an area, its network load shed behavior, and whether it is an interior or exterior area. The user utilizes the wall stations to assign each room to the appropriate area. Each area can be configured with its own independent ON/OFF schedule. The schedules may be configured as adaptive or hard-coded. For interior areas, hard-coded schedules are programmed by defining days and times in which the area is expected to be occupied. A plurality (e.g., up to eight) occupied periods can be defined for each area and a plurality (e.g., up to four) occupied periods may be defined for a special (e.g., holiday) schedules. For exterior areas, hard coded schedules are programmed by defining On and Off times for the connected lights on specific days of the week. A plurality (e.g., up to eight) On and Off times can be defined for each exterior area and a plurality (e.g., up to four) On and Off times may be defined for a special (e.g., holiday) schedule. A plurality (e.g., up to 32) recurring or unique dates may be defined to run the holiday schedule.

In one aspect, a user can define days and times for each area during which the wall switches and/or occupancy sensors in the area are either partially (no ONs or no OFFs) or fully (no ONs and no OFFs) disabled. A plurality (e.g., up to 8) periods can be defined for each area. The user has the option to make a mask schedule run during holidays, or not (default is that mask schedules do not run on holidays).

A user can schedule a load shed event to affect any or all areas by lowering the lights in that/those areas by a specified percentage. A plurality (e.g., up to 16) load shed periods can be defined to run on specific days of the week. As described herein, during a load shed event, the lights in each area fade from their current level to their new level over two minutes. Generally, an LED display on the wall station will not change due to the load shed event. If an occupant adjusts their local light level during the load shed period, the maximum that they will be able to raise the lights is 100% minus the load shed percentage.

A plurality (e.g., up to 16) of remote stations (for example, SYRS stations as available from Lithonia Lighting of Conyers, Ga.) can be connected to each global controller. The buttons on the remote stations can be configured to override one or multiple areas to a specific level, shed load in one or more areas by a specific percentage, or override the On/Off schedule for a specific time period. In one embodiment, the buttons or other input devices (e.g., switches, knobs, slide bars, etc.) can be programmed to trigger functions on the lighting system through the global controller. The remote stations are operably connected to the global controller, which monitors the input devices on the remote station. In accordance with the programming of the remote station, the global controller will send control signals to devices associated with the lighting system depending upon the signal received from the remote station. Devices that can be controlled include, for example, local controllers and lighting fixtures.

In one aspect, the dry contact input can be configured to override one or multiple areas to a specific level, shed load in one or more areas by a specific percentage, or override the On/Off schedule for a specific time period. The dry contact input can be configured to disable the local controls (wall switches, occupancy sensors, etc.) in conjunction with an override action for use with fire and burglar alarm systems.

The analog input can be configured manually with setpoints. If the analog input is being used with an exterior photocell, it can also be set up to configure its setpoints automatically through the use of the calculated dawn and dusk times compared to the analog level at that point. This input can be configured to control any area, but control of a specific local controller or room will require a sensor connector connected locally. As described herein, a sensor connector is configured to connect a photocell or an occupancy sensor to a local bus or a local controller.

In one aspect, the global controller can be configured with a temporary schedule override. For example, when a user presses the temporary schedule override button on the global controller, the system prompts the user for the length of the override (for example, 1, 2, 4, 6, 8, 12, 24, or 48 hours) and which area(s) should be affected. A default value can be set so that if the user does not enter a value, all areas are overridden for the default time period (e.g. four hours). During an override, all scheduled On/Off and masking events are suspended, but all enabled wall switches, occupancy sensors, and photocells are still operational. Load shed schedule events will also still run. At the end of the schedule override period, the system updates all areas per the normal schedules. Per normal operation, the occupants are given a warning before lights are turned off due to the return to the normal schedule.

BACnet Interface

BACnet is a data communication protocol for building automation and control networks. BACnet was developed under the auspices of the American Society of Heating, Refrigerating and Air-Conditioning Engineers (ASHRAE), BACnet is an American national standard, a European standard, a national standard in more than 30 countries, and an ISO global standard. The protocol is supported and maintained by ASHRAE Standing Standard Project Committee 135. The BACnet standard (ASHRAE 135) is hereby incorporated by reference in its entirety.

In one aspect, the global controller is provided with a BACnet interface. This allows the global controller and the automated lighting system to interact with a building automation system. For example, the building automation system can be configured to override lighting settings or to shed load through the BACnet interface of the global controller. For instance, configuration groups in a global controller can be modeled in BACnet as Load Control Objects 0-7, Analog Objects 0-7, and as Multi-State Objects 0-7. A load shed event can be requested by other systems on the BACnet network through either the Load Control Object or through writing to the present value of the Analog Output at Priority 4. The Multi-state object is not used for load shed purposes. A level of 100 or Null written to Priority 4 relinquishes the load shed. If a load shed event is requested via the Load Control Object, then the system responds to such requests as specified in the BACnet standard. If a load shed event is requested via the Analog Object, then the system converts this into a Load Control Object request and process accordingly.

The status of the load shed event is reported via BACnet as both a non-Null present value level at Priority 4 for the Analog Object and through the Load Control Object as defined in the standard. If the load shed request cannot be executed, the present value level for the Analog Output object is not changed. Changes to the present value of an Analog Output object at priorities other than 4 are rounded to the nearest defined step. A change to the present value of an Analog Output object at Priorities 3, 2, or 1 overrides an active load shed event. A level of 0 or Null at these priorities relinquishes to a lower priority.

A change to the present value of an Analog Output object at Priorities 5-16 changes the user-set (wall station) level for the rooms which are members of the corresponding configuration group.

If a command to change the present value of an Analog Output object is received via BACnet, the present value status changes to the new value after the command has been executed successfully. With the exception of load shed and panic switch events, the system does not update the Analog Output object present value to reflect changes made via other equipment (wall stations, sensor connectors, local controllers) in the system.

Local Controller

A local controller is provided for each separately controlled lighting zone. The local controller has the function of configuring, managing, and prioritizing all control devices for the lighting zone and room. In various aspects, the local controller is comprised of mechanically latching relays with integral manual override, electrical contactors (e.g., two pole 30-amp contactors), a photocell inputs, occupancy detector inputs, manual overrides, etc. In one aspect, the local controller is compatible with modular wiring as described herein, though it is to be appreciated that the local controller is contemplated to operate with standard hard-wiring as well. The local controller is configured for plug-and-play operation, it is not necessary for the installer to set any addresses or make any programming or configuration changes at the intelligent junction box in order to make the room operational.

The local controller is used in conjunction with other system components such as the wall station, the global controller, sensors and sensor connectors for multi-level control of one or more zones of lighting. The local controller provides control outputs to lights, wall stations and sensors in a lighting zone. In one aspect, when local controllers are installed in a cascade fashion, a local controller can send control signals to downstream local controller(s), pass global control signals from the global controller to downstream local controller(s), send signals upstream to the global controller, and pass signals from downstream local controller(s) to the global controller.

Sensors and Sensor Connectors

In one aspect, a modular sensor connector is provided as a means to connect a low voltage analog sensor such as, for example, an occupancy sensor or photocell to the an automated lighting system according to the present invention. The sensor connector is modular in that in one embodiment it is compatible and connectable to the modular wiring described herein, and self-configures to control all lighting zones in a room. The sensor connector is used to provide an input to the lighting system described herein for occupancy sensors and photocells.

In one embodiment, the sensor connector is powered by the communication bus (global or local bus) and provides, for example, 24VDC (+ or −10%) to power the connected sensor devices though other voltages are contemplated within the scope of this invention. Sensors such as photocells and occupancy sensors connect to the sensor connector with, for example, three Class 2 wires: +24VDC, ground, and signal, though other configurations are contemplated within the scope of this invention. In one aspect, compatible occupancy sensors return 0V when they are not sensing occupancy and 24VDC (input voltage) when they are sensing occupancy. Compatible photocells return a variable 0-10VDC that is directly proportional to the amount of light that is sensed. The sensor connector converts these analog signals to digital messages which are sent over the connected communication bus.

As described above, the sensor connector's circuit board derives its power from the connected communication bus. In one aspect, sensor input circuits are compatible with LSA APS and DEQ APS photocells and Litronic® occupancy sensors, as are available from Lithonia Lighting of Conyers, Ga., though other photocells and occupancy detectors are contemplated within the scope of this invention.

The sensor connector automatically detects the type of sensor (photocell or occupancy sensor) that is connected to each input and communicates this type to the connected local controller and/or the global controller for configuration. Alternately, the sensor connector detects the sensor type and configures itself for proper function. Connected occupancy sensors are automatically be configured as master devices and control all connected zones in the room. When multiple (>2) occupancy sensors are required for a room, multiple sensor connectors may be used in conjunction and connected to any zone. In this scenario, if any occupancy sensor senses occupancy, all the lights in the room remain on. When all sensors have timed out, then a warning sequence is issued (if warn is enabled for the zone), or the lights are turned off or set to minimum per the configuration. Connected photocells are automatically configured as zone devices and only control the zone to which they are connected.

The photocell/daylight harvesting function is self configuring. If multiple sensor control units with photocells are connected on a single zone, the average of the levels returned by the photocells can be used to set the light level.

The sensor controller is also a controller for daylight harvesting. It maintains a constant light level for a room by adjusting the ballast's light output as more or less daylight enters the room. The level the system tries to maintain is known as the set point. The system is an open loop proportional control system. Open loop control is accomplished even though the photocell "sees" the lights that it is controlling by removing the contribution due to the controlled light source. The controlled light is removed from the photocell reading by computing what the light output contribution is for each discrete level. By removing the effects of the controlled light source, the benefit of non-critical photocell placement is obtained. During the commissioning of the system, the maximum contribution from the ballast is measured by taking the difference of photocell readings at maximum output and off. The contribution for each discrete level can then be computed by applying the ballast's light output curve to the maximum contribution. The sensor connector continuously monitors light level commands, load shed commands, and wall station levels in order to calculate the current set point. Periodically the sensor connector calculates the amount of daylight present. As more daylight enters the room, the sensor connector requests the local controller(s) to reduce the lights to a lower level in order to maintain the set point. As less daylight enters the room, the sensor connector requests the local controller to raise the lights to a higher level in order to maintain the set point.

In one aspect, the embodiments of an automated lighting system as described herein advantageously employs a scaling factor to adjust for different room parameters. Photocells are typically mounted on the ceiling and light levels are to be maintained on the work surfaces. The correlation between the light on the work surface and the light on the ceiling is the scaling factor.

Wall Stations

Figure 3:
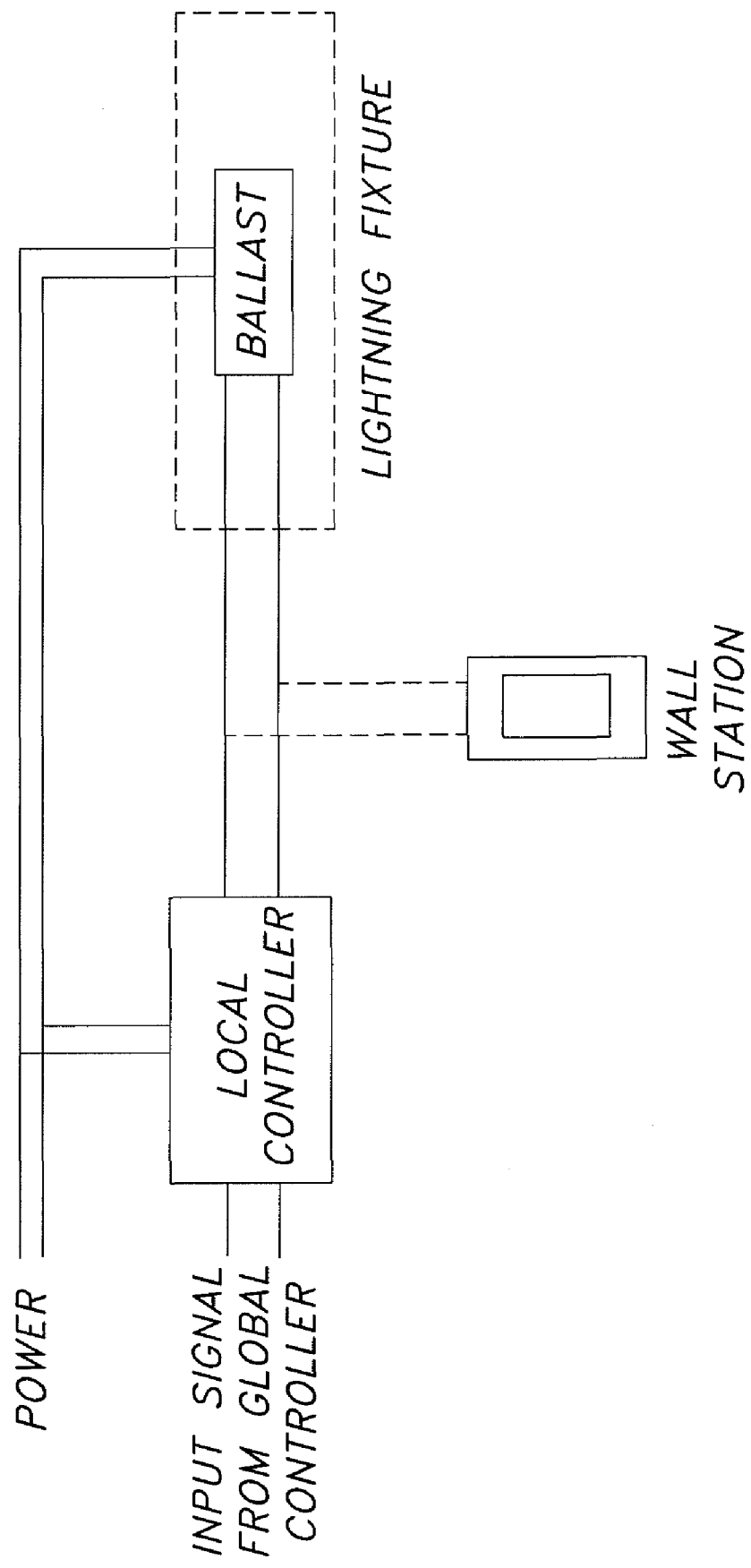
FIG. 3 illustrates an exemplary wall station connection, where wall stations are low voltage and connect to the system via a two wire, polarity and topology free network.

In one aspect, wall stations are used to provide control of light fixtures in a zone or a room. As shown in FIG. 3, wall stations are low voltage and connect to the system via a two wire, polarity and topology free network. No additional power wiring for the wall station is required as power switching is performed at the ballast or other DALI-protocol device. Wall stations are connectable using the modular wiring described herein, or can be hard-wired. Wall stations can be connected at any connection point in the zone.

Wall stations provide local ON/OFF and RAISE/LOWER control of a single zone or master ON/OFF and RAISE/LOWER control of multiple zones as configured. The wall station RAISE/LOWER control provide discrete lighting levels spaced at logical intervals to provide perceptible, even change in the light level and fade smoothly from one level to another. In one embodiment, seven levels or scenes are provided. It is not be necessary for the installer to manually set up the level operation.

In one aspect, wall stations provide current user level indication via an LED bargraph and can be equipped with a separate LED under the ON/OFF button to facilitate the location of the station in a dark room. In one embodiment, when the system has warned of an impending timeclock or occupancy sensor off event, the locator light blinks until the lights are either overridden on or turned off by the schedule. During a scheduled off time, wall stations time-out and automatically turn off the lights a designated time period (e.g., 2 hours) after the last user action. In one aspect, the wall station issues a warning sequence (as described herein) prior to automatically turning off the lights.

When occupancy sensors are installed as part of the automated lighting system, to accommodate periods of very low occupant activity (e.g., classroom 'quiet time'), the occupant can temporarily prevent the sensors from turning off the lights for a defined time period (e.g., one hour) by pressing and holding the on/off button for a certain amount of time (e.g., 3 seconds). When the designated time period has elapsed, the system re-evaluates the occupancy sensor status and issue a warning sequence prior to turning off the lights if occupancy is not currently being sensed. During the designated time period, the occupant has the capability to manually control the lights as desired from the wall station.

Multiple wall stations can be installed in a single zone. Multiple stations installed in a zone automatically work together in 3-way or 4-way configuration. It is not be necessary for the installer to make any programming, configuration, or switch setting changes for the stations to work in this manner. No additional wiring is required for this functionality. The wall station sends a signal to an associated local controller, which causes all the lights in the zone associated with that local controller to act in accordance with the signal received from the wall station. In one aspect, if the local controller is not on-line or not operational, then a signal is sent directly from the wall station to the lights in the associated zone.

In one aspect, a wall station can be configured as a master wall station. For example, if local controllers are installed in a cascaded manner (a first local controller is operably connected to the global bus of a global controller and one or more local controllers operably connected with the local bus of the first local controller and the local buses of subsequent local controllers), then the master wall station controls all lighting zones in a room together. The master local controller sends a signal to the first local controller, which then sends a signal to the downstream controllers to act in accordance with the signal received from the first local controller. Similarly, an occupancy sensor acts as a master device (i.e., controlling all zones) in a cascaded arrangement.

Modular Wiring

Figure 4:
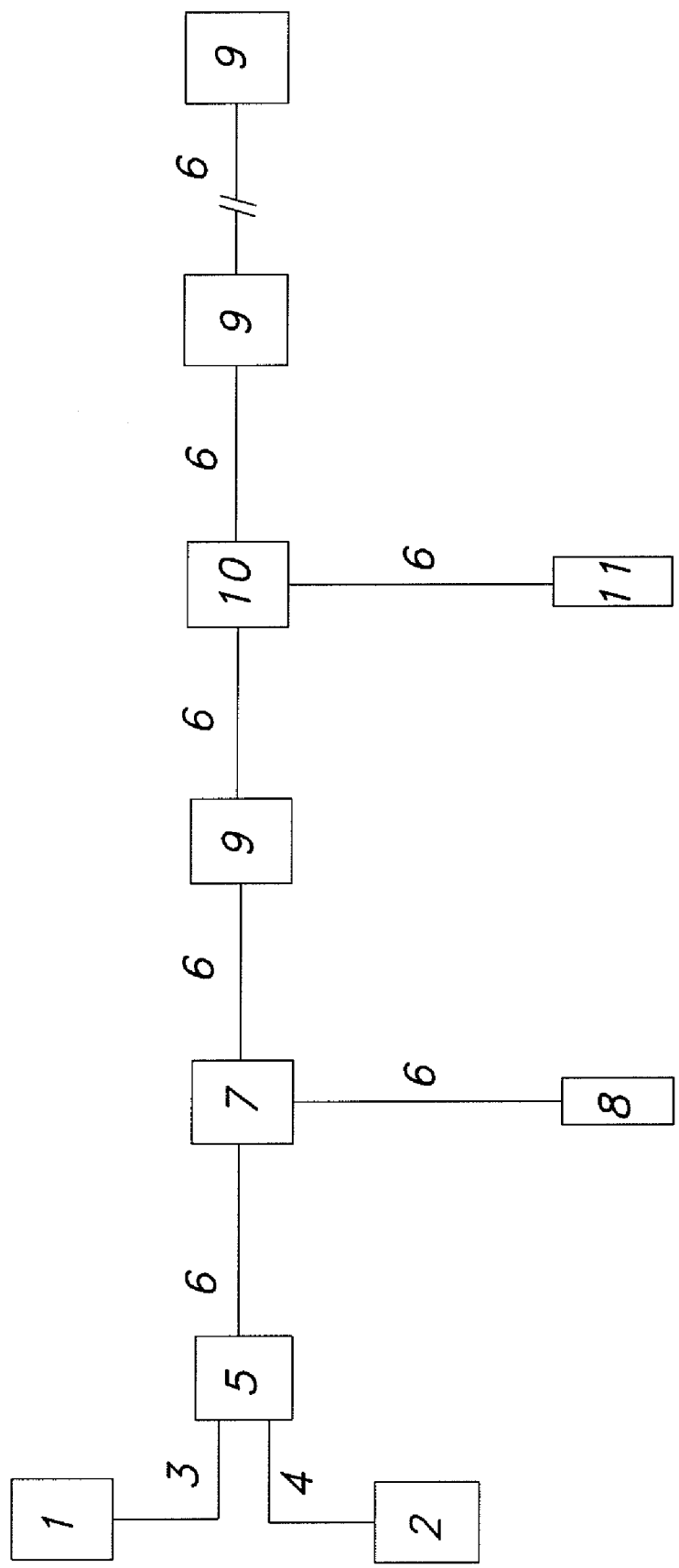
FIG. 4 shows one implementation of an exemplary system, which includes a global controller 1, wall station 8, and photocell 11 for a single circuit and single zone of lights 9.

Several examples of modular wiring automated lighting control systems are described herein. FIG. 4 shows one implementation of an exemplary system, which includes a global controller 1, wall station 8, and photocell 11 for a single circuit and single zone of lights 9. The global controller 1 according to this embodiment provides a time clock, a programmable device including programming interface, I/O to other systems, etc., to provide and receive digital signals to control the lighting as desired. A power panel 2 provides power to the lighting circuit. Control signal wiring 3 allows the global controller 1 to communicate with other system components. Power circuit wiring 4 delivers power to components and lighting fixtures. For an embodiment according to the present invention, a first local controller 5 combines power wiring 4 and control signal wiring 3 into a single modular wiring cable 6 carrying both power and signal wires that is then used to connect all system components. The local controller 5 may include a microprocessor and control circuitry to allow coordination between multiple override or manual control elements for the zone. In the example shown in FIG. 4, both a manual wall station 8 and a photocell 11 are shown. The local controller 5 coordinates the ability of each of the manual components to affect the lights in accordance with default settings or user programming. An override switch Tee-connector 7 may carry only signal wiring or both power and signal wiring to the wall station 8. The wall station 8 receives and transmits control signals. This wall station 8 enables the occupant to manually change the light level in the room, or signal the local controller 5 to request a level change, which the local controller 5 evaluates and acts on in accordance with its programming. Lighting fixtures 9 include control signal receiver and lighting control devices. Generally, these devices communicate in accordance with the DALI protocol. Sensor Tee-connector 10 may carry only signal wiring or both power and signal wiring to the sensor connection point. Sensor 11 would typically include (but not be limited to) occupancy sensors and photocells.

Figure 5:
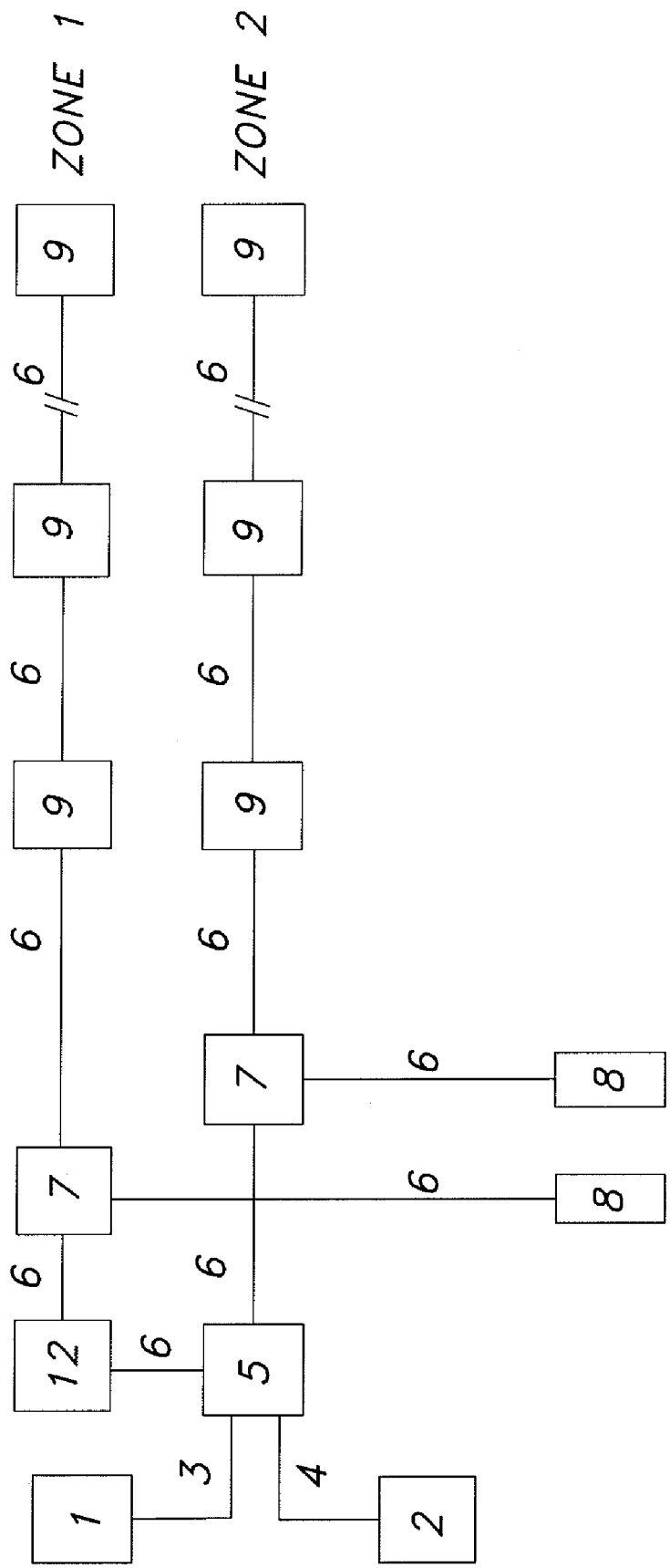
FIG. 5 illustrates another exemplary implementation according to an embodiment of the present invention, which adds a second zone of lights and a second wall station 8 for that zone which is connected to the modular wire 6 through another Tee-connector 7.

FIG. 5 illustrates another exemplary implementation according to an embodiment of the present invention, which adds a second zone of lights and a second wall station 8 for that zone which is connected to the modular wire 6 through another Tee-connector 7. Local controller 5 is connected in cascade to a second local controller 12, which allows additional independently controlled lighting zones powered by the same circuit and control schemes as previously described in relation to cascading.

Figure 6:
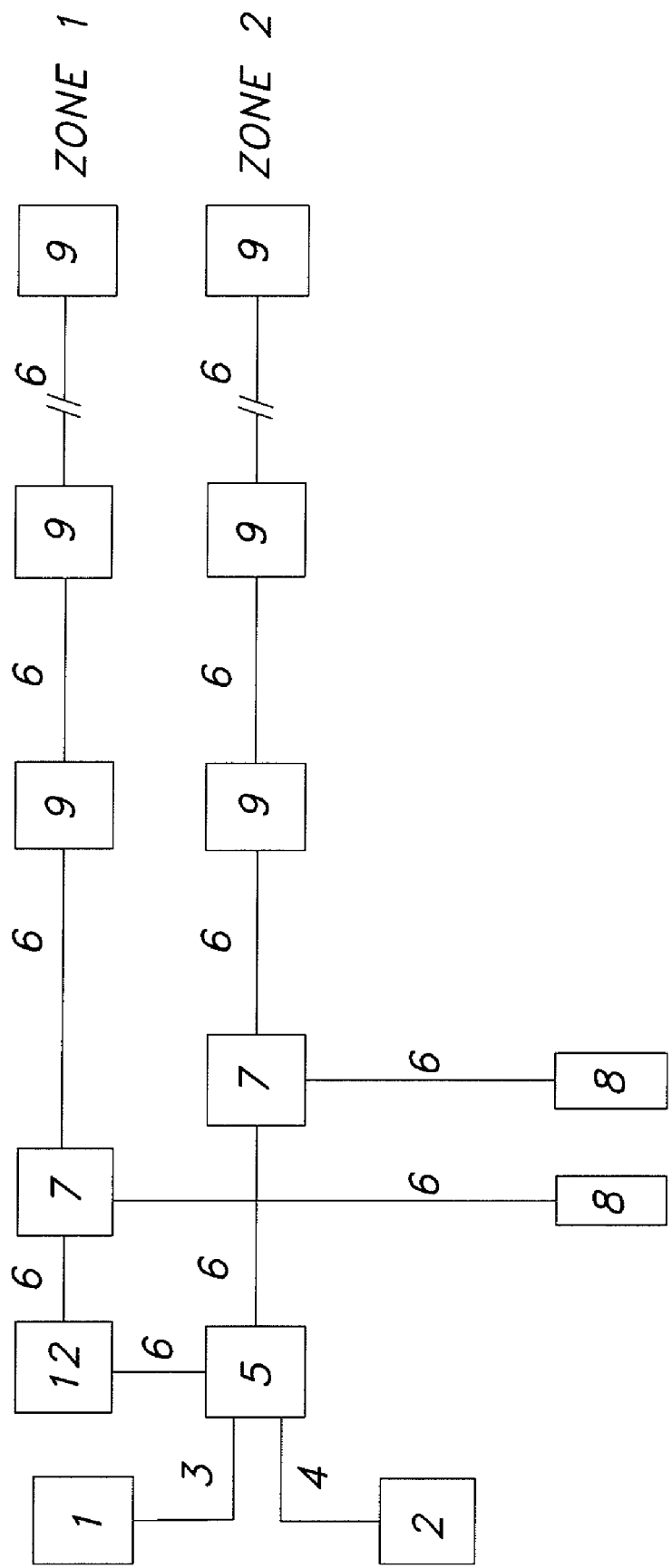
FIG. 6 illustrates an exemplary implementation which adds another wall station 13 to provide group control of both zones.

FIG. 6 illustrates an exemplary implementation which adds another wall station 13 to provide group control of both zones. This wall station 13 can be a specifically designed piece of hardware or the same hardware as is used for wall station 8, but field-configured to function as a group override switch. The wall station 13 provides single point tandem control of a group of lighting zones. The wall station 13 is also connected to the modular wire 6 through another Tee-connector 7.

Figure 7:
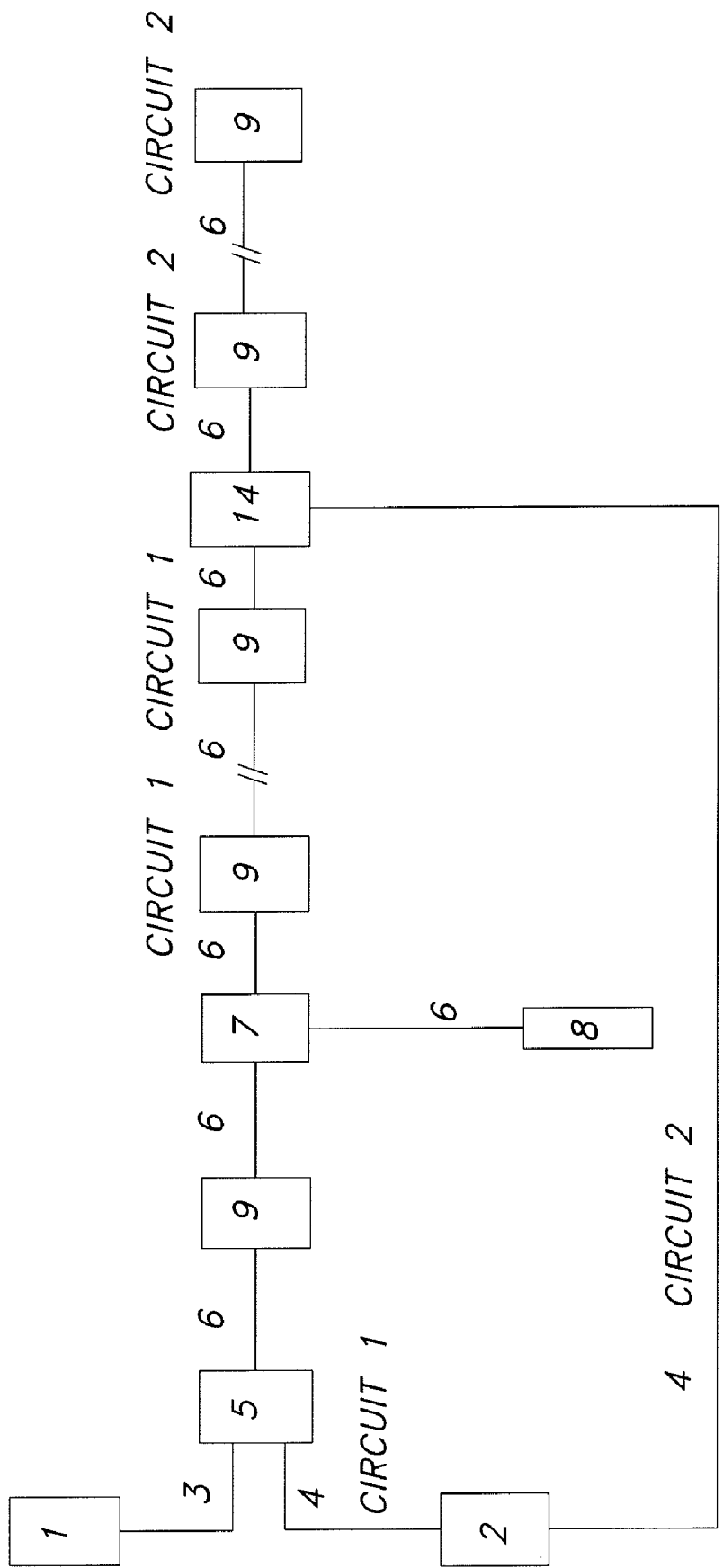
FIG. 7 illustrates an exemplary implementation which incorporates another power circuit to power some of the lights in the control zone.

FIG. 7 illustrates an exemplary implementation which incorporates another power circuit to power some of the lights in the control zone. Circuit joiner connector 14 allows a second circuit to power the lighting fixtures 9 in part of a larger lighting zone. Power from the power panel 2 is connected by power circuit wiring 4 to the circuit joiner connector 14. As shown in FIG. 5, the circuit joiner connector 14 terminates circuit 1, connects circuit-2 to the lighting fixtures 9 to be on a separate circuit, and connects the communication wires formerly carried with circuit-1 to be carried on the modular wire 6 in circuit-2. There are many ways that the circuit joiner connector 14 could be integrated in an implementation of this system, including the incorporation of more than two circuits, the incorporation of normal and normal/emergency power/standby power source (such as battery back-up), or the incorporation of multiple voltages, etc. on a single zone.

Adaptive Scheduling

In order to improve the savings of energy, it is desirable to make the time for leaving lights in a building or facility on as short as practicable. On the other hand, since the needs of individuals for lighting vary between individuals and even over time, it is desirable to provide both flexibility and adaptability of lighting control systems, so that individuals are not unduly inconvenienced, yet allowing for lighting when necessary. However, currently marketed energy management systems with time-of-day schedules must be manually programmed and are unable to automatically learn and adapt to a pattern of occupant use.

In order to provide flexibility, means for overriding a shutdown of lights in a zone are provided, so that an individual may either turn on the lights if they are off, or maintain the lights as being on in anticipation of the control system turning off the lights. The control system may provide a warning that the lights will be turned off after some further elapsed time, such as by blinking the lights, in order to make an individual occupying the space aware that he should override the control system so that the lights remain on.

In various instances, the means for overriding (or simply turning on) the lights may be a wall station, a wall switch, a wireless control, or even a workstation or personal computer on a network that communicates with the central control system. The override causes the lights to remain on for a fixed period of time such as, for example, 30 minutes or one hour. That is, the override automatically "times out" after a period of time, after which the lights will then turn off (or give the individual the opportunity to cause a further override of the system). The override is basically a mechanism, such as a wall station, which will turn on the lights in its designated zone at any time. The control system then determines whether to enable or disable the time out, such that the lights will be turned off only when the time out is enabled and the period of time has expired, based on whether or not the time at which the time out occurs is during the control system schedule for deactivating power to the lights (i.e. turning off the lights) in a zone.

Interactive firmware or software is used with energy management equipment (such as a lighting control system) that monitors user overrides to automatically adjust the lighting on/off schedule to fit occupancy patterns. For any zone, the schedule of powering on or off of the lighting may be adjusted earlier or later based on the frequency of overrides in that zone. For instance, algorithms in the control system firmware or software can extend the schedule for a zone by a fixed time (e.g. 30, 60, 90 or 120 minutes) if an override for that zone occurs for a number of consecutive days (e.g. 3 business days in a row) or for a specific number of days in a fixed period (e.g. overrides in three days out of seven). If, after an adjustment, further overrides occur with a defined frequency, the scheduled time for a zone may be further extended.

Similarly, the control system logic may shorten the scheduled power off time for a zone if no overrides have occurred in a specified period of time (e.g. no overrides for two weeks). In this way, the scheduled time for turning off the lights in a zone is continually adaptable to recent conditions recognized by the control system.

In the same way, the schedule for the beginning of the period during which the control system will not automatically power off lights in any zone (scheduled "on" time) may also be adaptively adjustable based on recognizing when or how often overrides occur within a set period of time before the scheduled "on" time.

An example sequence of operation for is described below, with reference to FIG. 1.

In this implementation, the system is a lighting energy management system that comprises a global controller 112 in communication with one or more local controllers 104 with a timing device or timeclock mechanism (electronic or electromechanical), a means to control the lights 106 (relays, dimmers, digital network or other), and override switches 108. Initially, the local controllers 104 are place in an adaptive mode by the global controller 112. There are multiple separately controlled groups of lights 106, or "zones" controlled by the system, each with an override switch 108 that connects to the control system. The control system has the ability to automatically "time out" a zone and turn off the lights in the zone after a certain period of time has elapsed after the override switch has been used to turn the lights on. The control system also has the ability to cancel this timeout function so that the lights stay on even after the time out period has elapsed. Furthermore, the control system can cause the switches to no longer automatically time out as part of the adaptive scheduling operation.

EXAMPLE

1. User sets the current time on the global controller 112 user interface and indicates the zones that are to be adaptively controlled.
2. The global controller 112 has initial default values for an ON time and an OFF time. Note that the ON time in this example does not actually turn the lights 106 ON, but rather disables the automatic time out function for the zone related to the override switches 108 for 'manual on, automatic off' operation. Other implementations of this invention might set the lights to a specific level or levels of brightness at the ON time or not cancel the timeout function.
3. Signals indicating the zones designated for adaptive control and their initial ON and OFF times, as well as time setting information is passed to the local controllers 104 for each designated zone.
4. When the OFF time occurs for a designated zone, the local controller 104 warns the occupants of the impending turning off of the lights in the zone through visual or audible means, and the local controller monitors user overrides for each zone and occupancy sensors 110 for the zone. If no override is received, it will turn off the lights and enable the time out feature for the zone. In one aspect, the local controller determines if there is any indication of occupancy through the occupancy sensor before turning off the lights in a zone.
5. If the local controller 104 senses a certain number of overrides for a zone in the warning period or shortly after the OFF time, it will automatically increment the OFF to a later time. If the local controller 104 does not receive any overrides within that period, it may automatically decrement the OFF time. The local controller 104 seeks the goal of the earliest OFF time that causes no more than an acceptable or predetermined number of such immediate overrides.
6. Once the control system has determined that a zone is past the OFF time by a predetermined period of time, and has turned off the lights for the zone, if the controller senses that an override switch for a zone has turned the lights on prior to the scheduled ON time and not allowed to timeout and automatically turn off the lights in the zone before the scheduled ON time (in other words, an individual has continuously overridden until the ON time), the controller will decrement the scheduled ON time to an earlier time.

7. The local controller 104 also monitors when lights in a zone are manually switched on after the scheduled ON time, and will automatically increment the scheduled ON time for a zone if no overrides (i.e. lights turned on) are received within a certain period of time after the scheduled ON time. The controller 104 seeks the goal of no more than an acceptable or predetermined number of such overrides prior to the ON time.

As discussed above, lighting control systems, such as the embodiments discussed herein, can provide a warning that the lights will be turned off in a zone after some further elapsed time by, for example, blinking the lights. Automatic lighting control systems currently offered in the market warn occupants of an impending scheduled lights-off event by blinking the lights (turning them off momentarily and then returning them to their previous level). However, it is to be appreciated that for lighting systems capable of dimming the lights, the occupants can fail to notice the warning "blink" if the lights are initially set at a very low level.

An aspect according to an embodiment of the present invention is a warning method that uses levels other than turning the lights completely off during the blinking to warn the occupants of an impending turning off of the lights. While there are many possible variations to accomplish this function contemplated within the scope of this invention, one aspect is to have the local controller 104 evaluate the current lighting level (in a zone) by use of sensors 110 such a photocell, and ramp the lights to the full (100%) lighting level, rather than fully off (0%) if the current lighting level is below a certain threshold. Another aspect is to sequence the lighting level to dim the lights from the current level to minimum (0%) over a short period of time (e.g., 1 second), then to adjust the lighting from minimum to maximum (100%) over a further short period of time, and then to return the lighting to the previous current level. The warning methods can be implemented as part of embedded software running on a local controller's 104 system processor or time clock.

The embodiments of warning systems described herein provide an occupant the opportunity to use an override to the scheduled lights-off event, or it may give the occupant a sufficient warning to allow for departure from the area before the lights are turned off. This improved warning system is applicable both to the automatically adapting control system discussed herein and to other lighting control systems that automatically turn off lights.

When adaptive scheduling is implemented, one embodiment of the automated lighting system comprises a central timing device or timeclock that is connected to individual local controllers, which each have a real time clock, processor, non-volatile memory and a connected user interface (e.g., wall station) for override of the lights. Generally, local controllers are configured as either 'indoor' or 'outdoor,' and such configuration is communicated to the central timeclock as needed to support automatic scheduling functions described herein. A local controller can optionally have an occupancy sensor or photocell connected for that zone as well through the use of a sensor connector. Multiple zones in a single room are controlled through the use of cascaded (serially connected) local controllers, which may or may not have one or more connected wall station(s) configured as 'master' to control all room zones simultaneously.

The timeclock schedule is configured via the central timeclock and runs on the local controller. The central timeclock has a plurality (e.g., eight) independent schedules that are programmed separately and run concurrently. Each of these schedules can be configured to be either adaptive or contain customer-programmed events for individual days of the week or specific days of the year (holidays), as previously described herein. Each local controller follows only one of these schedules, which is selected via the wall station setup procedure. Also as previously described herein, the schedule has various states that can be set.

If a photocell is connected to a local controller used to control lighting fixture ballasts according to an embodiment of the present invention, then the photocell has the ability to dim the lights up and down in response to incident light on the photocell, but not turn the lights ON and OFF. The lights must be turned ON and OFF from the schedule, Building Automation System network, wall station, or occupancy sensor. If a photocell is connected to a local controller that controls non-dim lighting loads, then it has ON/OFF control of the load (when not masked) and work as last-command-takes-precedence with the schedule and manual overrides.

If no occupancy sensor is connected to the automated lighting system in the room having adaptive scheduling, when the schedule transitions from an 'occupied' to an 'unoccupied' period, the local controller(s) issue a warning (if the warning feature has not been disabled locally). If the user does not press the on/off paddle on one of the wall stations in the room (any zone), the lights will turn off after the warning sequence. If the user does press the paddle, the lights will remain on for another designated period of time (e.g., one or two hours). At the end of the designated time period, another warning sequence is issued.

During 'unoccupied' periods, the local controller automatically times-out, warns, and turns off the lights a designated time period (e.g., one or two hours) after the last user action.

If the lights were turned on during an 'unoccupied' period and the automatic off timer is still running during a transition to an 'occupied' period, the timer will be cancelled and the lights will remain on.

At the beginning of an 'on and occupied' period, the lights for the zone will be turned on to their last level before they were last turned off and any automatic off timers will be cancelled. During 'occupied' periods, the local controller will not automatically time-out and turn off the lights.

If an occupancy sensor is connected in the room, then when the schedule transitions from an 'occupied' to an 'unoccupied' period, the local controller issues a warning sequence (if the blink feature has not been disabled locally) only if the occupancy sensor signal wire is low or the sensor is masked. If, with a certain time period after the warning, the user has not pressed the on/off paddle on the wall station, the lights will turn off. If the user does press the paddle, the lights will then remain on for a designated period of time (e.g., one or two hours), or until the end of the occupancy sensor masking period, whichever is earlier. If the lights are on when the sensor masking period ends, the lights will stay on at their current state if the occupancy sensor signal wire is high or warn if the signal wire is low.

During 'unoccupied' periods, the local controller automatically initiates a warning sequence a designated time period (e.g., one or two hours) after the last user action at the wall station whenever the sensor is masked. When the occupancy sensor is unmasked, it causes the lights to turn on when the signal wire goes high and initiates a warning sequence when the signal wire goes low. If the occupancy sensor is unmasked, the lights will not time out as long as the occupancy sensor signal wire is still high.

If the lights were turned on during an 'unoccupied' period and the automatic off timer is still running during a transition to an 'occupied' period, the timer will be cancelled and the lights will remain on.

At the beginning of an 'on and occupied' period, the lights for the zone will be turned on to their last level and any automatic off timers are cancelled.

During 'occupied' periods, the local controller does not automatically time-out after a wall station action and turn off the lights. If the occupancy sensors are configured for 'automatic on/automatic minimum', then they do not provide a warning when the signal wire transitions from high to low but rather just lower the lights to minimum. During 'unoccupied' periods, the local controller initiates a warning sequence and turns the lights off if no motion is detected or override received prior to the 5 minute warning timeout.

Adaptive Scheduling Algorithm

When a zone is scheduled as adaptive, the local controller can be configured to start with default settings such as, for example, indoor areas having a ON signal at 6:00 A.M., if occupied, and an OFF signal at 7:00 P.M., if unoccupied. Similarly, if the zone is in an outdoor area, the local controller may have default settings such as having an OFF signal at dawn and an ON signal at dusk, as dawn and dusk are determined by the local controller.

If an indoor area, the local controller monitors the times of user override in the room. If more than one local controller is used for the room (i.e., local controllers are cascaded), the 'lead' (first in the chain) local controller coordinates the schedules.

Generally, the initial period after the time and date are set on the global controller is used to find the typical period of occupation for the room. In most applications, this will be the length of the work day. In one specific example, during this period, the system monitors ON overrides by the occupants within 15 minutes after the warning blink for the scheduled OFF time. If there is no override for three consecutive days, the local controller decreases the OFF time by 30 minutes. When four overrides are received in a two-week period, the OFF time is set for 15 minutes after the average of the four override times. The elapsed time between the scheduled ON time and scheduled OFF time is stored as the typical period of occupation for the room. If the scheduled ON time for the room remains within +/−45 minutes of the time at which it was set when the period of occupation was found, the OFF time remains fixed. If the scheduled ON time is adjusted outside of this window, the OFF time is decreased progressively by two minutes a day until the occupant overrides the lights back on after the scheduled warning blink. When the occupant overrides the lights, the OFF time is no longer be reduced. If a second override is received after a scheduled OFF within a week of the initial override, the OFF time is increased by 15 minutes.

After the initial 'period of occupancy' has been found, if the scheduled ON time has remained within the +/−45 minute window and an override is received after the scheduled OFF time, the scheduled OFF time is not adjusted nor are other ON overrides evaluated for one week after the first override. If, after this first week, four or more overrides are received within a two-week window, then the scheduled OFF time is increased by 60 minutes.

In one embodiment, conditions such as cleaning crew or unusual off-schedule occurrences are taken into consideration. For example, in one aspect the following events have no effect on the schedule: the lights are overridden ON during an unoccupied period, allowed to time out and turn back off, and not overridden back on again within 15 minutes; or, the lights are overridden ON and then overridden OFF prior to the timeout.

If the lights are overridden OFF prior to the scheduled OFF time and remain OFF until, for example, 15 minutes after the scheduled OFF four times in a rolling 14 day period, then the OFF time is adjusted to the average of the OFF override times plus 15 minutes.

If the local controller controls a zone having outdoor lights, then if no photocell is connected, the schedule can be set up to turn on at dusk and off at dawn. Generally, the local controller does not issue a warning sequence prior to turning off the lights in an outdoor area.

If a photocell is connected to either the central timeclock analog input or to a sensor connector at the local controller that is not otherwise configured, the photocell automatically controls outdoor lighting areas in conjunction with the astronomic timeclock schedule on a last-command-takes-precedence basis.

Load Shedding

In one embodiment according to the present invention, the global controller provides three main methods for the user to trigger load shed events: BACnet/IP connection, SYRS Digital Remote Station, and time schedule. These access methods work on a 'last command takes precedence' basis, in which the parameters of a new load shed request override the current load shed event if one is currently active. All methods utilize and update the BACnet Load Control Object as defined in ANSI/ASHRAE Standard 135-2004e-1 Clause 12.17, as previously incorporated herein.

Each configuration group (a/k/a, area) on the global controller is independently controlled for load shedding, as they are for other global command types. The amount of load to be shed can be expressed as a percentage by which a user-set, schedule-set, or sensor-set level is multiplied. No load shed=100%, a request for a 20% reduction=80%, and so on, consistent with the 'Percent' choice in Table 12-21 of Standard 135-2004e-1. These percentages correspond with the approximate power used by the lighting load, rather than the light output of the ballast. As a result, available load shed percentages are 100% (no load shed) to 16% (max load shed) and 0% (off). Requested load shed percentages >0% and <16% will default to 16%. The load shed percentage is proportional to the user-set or system-set level. For example, if the user has the lights set at 100% and a load shed level of 80% is requested, the lights will be dimmed to 80% power. If the user had the lights set at 50% when the 80% load shed level was requested, then the lights would dim to 40% power.

When a load shed event becomes active, the system dims the lights from their current level to the load shed level over a time period such as, for example, 30 seconds. Similarly, when the load shed event ends, the system reverts the lights back to the full user set level over, for example, 30 seconds.

Normal system schedules, automated, and local control remain functional during load shed events as is possible per the current load shed level (in other words, if the current load shed level were 16% (maximum load shed), the user would only be able to turn their lights on at minimum and off; if the current load shed level were 0%, the user would no longer be able to turn on the affected lights). When the lighting level for a particular local controller is requested via a wall station, schedule, or sensor, the system recalculates the appropriate level at which to set the lights per the current load shed level.

Load shed events either configured via the global controller or requested via a BACnet client must be accompanied by a shed duration time period. Shed events configured via the global controller can last from one minute up to and including 24 hours. Shed event request by a BACnet client may have shed duration periods as allowed by the standard.

A load shed event may be cancelled by either timing out on its own when the duration time expires, or when a shed level value of 100% is requested. When the load shed event is cancelled, the system returns the lights to the full user-set level.

In one aspect, a dry contact input on the global controller, as previously described herein, can be configured as a panic switch, which will override all current user, load shed, and daylight-controlled levels for the assigned group(s) to 100% when closed. In BACnet, this appears as a level at Priority 3. When the contacts connected to this input open, the system returns the lights to the current level defined by the load shed and user set levels.

If a load shed event is currently active, a message is provided on the home screen of the LCD display (see FIG. 2) indicating "Load Shed Grp #". If more than one group has a load shed event active, the status of each is displayed in turn.

BACnet Interface:

Configuration groups in the global controller are modeled in BACnet as Load Control Objects 0-7, Analog Objects 0-7, and as Multi-state objects 0-7. A load shed event can be requested by a BACnet client through either the load control object or through the analog output at Priority 4. The multi-state object is generally not used for load shed purposes, though not precluded.

Load Control Object: The system can support load shed event requests as both a level and as a percentage, as defined in Section 12.17.10 and Table 12-21 of the BACnet standard. A percent request functions as described above. Levels can be pre-defined to simply correspond 1-to-1 to the available load shed percentages. For example, level 100=100%, level 65=65%, and so on.

The standard defines a 'baseline' property (FULL_DUTY_BASELINE), which notifies clients of the full load amount (in kW) connected to a given object instance. The baseline amount for each configuration group can be manually configured via the global controller. The default value for this property is 0. The 'Amount' choice for the load shed value is only supported if the baseline value has been configured as >0.

When a load shed request is received from a BACnet client via the load control object, the system responds as defined in the standard and executes the request if possible (Null values in analog output object priorities 1-3).

Analog Output Object: A load shed event may be also be requested by a BACnet client as a non-Null level written to Priority 4 of the corresponding Analog Output object of the configuration group. Load shed events requested in this manner are automatically given a duration time of 24 hours. When a load shed event is requested via the Analog Object, then the system converts this into a load control object request and process accordingly.

A level of 100 or Null written to Priority 4 relinquishes the load shed and the duration time is reset to 0.

The status of the load shed can be reported via BACnet as both a non-Null present value level at Priority 4 for the Analog Object and through the Load Control Object as defined in the standard. If the load shed request cannot be executed, the present value level for the Analog Output object is not changed.

Time Schedule for Load Shedding: Load shed events may be programmed to occur per a predefined time of day schedule through the use of the global controller. Load shed schedules can be configured by the user by first selecting the appropriate configuration group, then by configuring the following load shed events properties: start time, end time, days, and shed percentage. Up to eight load shed events may be configured for each group.

Further, a remote station's (e.g., a SYRS station) buttons may be programmed to activate a pre-defined load shed event that has been configured with a shed percentage and duration. A button programmed with a shed percentage of 100% does not have a duration and cancels an active load shed event when pressed. The button LED illuminates when the corresponding load shed event is active and extinguish when the event duration expires or the event is cancelled through some other means.

Conclusion

The above represents only a few examples of how a particular system might be implemented. There are numerous variations and additional features and capabilities that might be included in other variants.

The above examples are put forth so as to provide those of ordinary skill in the art with a complete disclosure and description of how the compounds, compositions, articles, devices and/or methods claimed herein are made and evaluated, and are intended to be purely exemplary of the invention and are not intended to limit the scope of what the inventors regard as their invention.

Throughout this application, various publications and/or standards may be referenced. The disclosures of these publications in their entireties are hereby incorporated by reference into this application in order to more fully describe the state of the art to which this invention pertains.

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A distributed intelligence lighting system, comprising:
a global controller having at least one processor operably coupled to a global bus;
a first local controller having a first processor, wherein the first local controller is operably coupled to the global bus and a local bus, and wherein the first local controller receives a first group of control signals from the global controller through the global bus, and further wherein the first group of control signals configure the first local controller in a first operational state;
a second local controller having a second processor operably coupled to the local bus, wherein the second local controller receives a second group of control signals from the first local controller, wherein the second group of control signals configure the second local controller in a second operational state, and wherein the second local controller transmits a third group of control signals to the first controller, and further wherein the second local controller controls at least one lighting fixture in accordance with at least the second operational state;
modular wiring comprising power wiring and control wiring in interlocking sections, wherein the modular wiring forms at least in part the global bus and the local bus, the modular wiring operably coupling a power supply and the global controller with at least the first local controller and the second local controller, the at least one lighting fixture, at least one sensor, and at least one wall station; and wherein the first local controller operates the at least one lighting fixture coupled to the local bus in accordance with one or more of the first group of control signals or the third group of control signals.

2. The distributed intelligence lighting system of claim 1, wherein the first operational state or the second operational state comprises adaptive control.

3. The distributed intelligence lighting system of claim 2, wherein an ON time interval or an OFF time interval for the distributed intelligence lighting system is automatically adjusted by override of a first control signal from the first local controller or a second control signal from the second local controller by the at least one wall station.

4. The distributed intelligence lighting system of claim 1, wherein the first operational state or the second operational state comprises manually-programmed time-of-day control.

5. The distributed intelligence lighting system of claim 1, wherein the at least one sensor comprises one or more photocells, and wherein the at least one sensor is operably coupled to the first local controller.

6. The distributed intelligence lighting system of claim 5, wherein the at least one lighting fixture is dimmed or brightened by the first local controller or the second local controller based at least on signals received from the one or more photocells.

7. The distributed intelligence lighting system of claim 1, wherein the at least one sensor comprises one or more occupancy sensors, wherein the at least one sensor is operably coupled to the first local controller.

8. The distributed intelligence lighting system of claim 7, wherein the first operational state or the second operational state is adaptive control, and an ON time interval or an OFF time interval for the distributed intelligence lighting system is automatically adjusted by the first local controller or the second local controller via detection of occupancy by the one or more occupancy sensors.

9. The distributed intelligence lighting system of claim 1, wherein the at least one sensor comprises one or more photocells and one or more occupancy sensors, wherein the at least one sensor is operably coupled to the first local controller.

10. The distributed intelligence lighting system of claim 1, wherein the first local controller, the at least one lighting fixture operably connected to the local bus, the at least one sensor, and the at least one wall station operably coupled to the local bus comprise a first zone, and the distributed intelligence lighting system is comprised of a plurality of zones.

11. The distributed intelligence lighting system of claim 10, wherein one zone provides lighting in a single room.

12. The distributed lighting system of claim 10, wherein more than one zone provides lighting in a single room.

13. The distributed lighting system of claim 10, wherein the distributed lighting system is comprised of at least the first zone and a second zone, the first local controller of the first zone is operably connected to the global bus and the second local controller of the second zone is operably connected with the local bus of the first zone.

14. The distributed lighting system of claim 10, wherein the distributed lighting system is comprised of at least a first zone and a second zone, the first local controller of the first zone is operably connected to the global bus and the second local controller of the second zone is operably connected with the global bus.

15. The distributed intelligence lighting system of claim 1, wherein the at least one lighting fixture comprises ballasts configured to communicate in accordance with Digital Addressable Lighting Interface (DALI) protocol, and wherein at least a fourth group of control signals from the first local controller control the at least one lighting fixture.

16. The distributed intelligence lighting system of claim 1, wherein the at least one wall station is configured to adjust light output of the at least one lighting fixture in accordance with the DALI protocol, and further configured to override automated control of the at least one lighting fixture.

17. The distributed intelligence lighting system of claim 1, wherein the first local controller further operates the at least one lighting fixture coupled to the local bus in accordance with one or more of signals received from at least one sensor, or inputs received from at least one wall station.

18. A method of operating a distributed intelligence lighting system comprising:

providing global control signals from a global controller to one or more first local controllers through a global bus;

receiving by the one or more first local controllers the global control signals and sensor signals from one or more sensors operably coupled with the one or more first local controllers; and controlling by the one or more first local controllers one or more respective lighting devices and one or more respective second local controllers, wherein the one or more respective lighting devices and the one or more respective second local controllers are operably coupled with the one or more first local controllers via a local bus, wherein the controlling comprises exchanging a group of local control signals amongst at least one first local controller of the one or more first local controllers and at least one second local controller of the one or more second local controllers, wherein the global bus and the local bus are comprised of modular wiring comprised of power wiring and control wiring in interlocking sections, the modular wiring operably connects (I) a power supply and the global controller with the one or more first local controllers, and (II) the one or more first local controllers with the respective lighting devices, the one or more sensors, and the one or more respective second local controllers, wherein the global control signals comprise control signals that place the one or more first local controllers in an operational state, and wherein the one or more first local controllers operate the one or more respective lighting devices and the one or more respective second local controllers in accordance with one or more of the global control signals received from the global controller and from sensor signals received from the one or more sensors.

19. The method of claim 18, wherein controlling by the one or more first local controllers of one or more respective lighting devices comprises controlling at least one lighting fixture having a ballast configured to communicate in accordance with the Digital Addressable Lighting Interface (DALI) protocol.

20. The method of claim 18 further comprising providing at least one wall station operably connected with the local bus, wherein the at least one wall station are configured to adjust a scene setting of the respective lighting devices connected to the local bus in accordance with the DALI protocol and to override automated control of the lighting devices.

21. The method of claim 20, further comprising automatically adjusting an ON time interval or an OFF time interval for the distributed intelligence lighting system by override of local control signals from the one or more first local controllers by the at least one wall station.

22. The method of claim 18, wherein placing the one or more first local controllers in an operational state comprises placing at least one of the one or more first local controllers in adaptive control.

23. The method of claim 18, wherein placing the one or more first local controllers in an operational state comprises placing at least one of the one or more first local controllers in manually-programmed time-of-day control.

24. The method of claim 18, wherein receiving by the one or more first local controllers sensor signals from one or more sensors operably connected with the one or more first local controllers comprises receiving sensor signals from one or more photocells.

25. The method of claim 24, further comprising adjusting the respective lighting devices by the one or more first local controllers based up sensor signals received from the one or more photocells.

26. The method of claim 24, further comprising adjusting the one or more respective second controllers by said one or more first local controllers based up sensor signals received from said one or more photocells.

27. The method of claim 18, wherein receiving by the one or more first local controllers sensor signals from one or more sensors operably connected with the one or more first local controllers comprises receiving sensor signals from one or more occupancy sensors.

28. The method of claim 27, further comprising adjusting the respective lighting devices by the one or more first local controllers based up sensor signals received from the one or more occupancy sensors.

29. The method of claim 27, further comprising adjusting the one or more respective second controllers by said one or more first local controllers based up sensor signals received from said one or more occupancy sensors.

30. The method of claim 27, wherein placing said one or more first local controllers in an operational state comprises placing at least one of said one or more first local controllers in adaptive control and an ON time interval or an OFF time interval for the distributed intelligence lighting system is automatically adjusted by the one or more first local controllers via detection of occupancy by the one or more occupancy sensors.

31. The method of claim 18, wherein receiving by the one or more first local controllers sensor signals from one or more sensors operably connected with the one or more first local controllers comprises receiving sensor signals from one or more photocells or one or more occupancy sensors.

32. The method of claim 18, wherein controlling by the one or more first local controllers of one or more respective second local controllers comprises the respective second local controller receiving control signals from the one or more first local controllers and controlling a set of one or more lighting fixtures in accordance with the control signals.

33. A lighting control system, comprising:
a global controller for controlling at least one zone of lighting with global digital signals, wherein each zone of the at least one zone of lighting comprises a first set of one or more light fixtures;
a converter that collects power from a power supply and global digital signals from the global controller, wherein the converter directs the global digital signals to control wires in a modular cable coupled to the converter, and the power to power wires in the modular cable, the power wires and the control wires configured in interlocking sections;
a first local controller coupled to the modular cable and having as inputs the global digital signals and sensor signals from at least one sensor, wherein the first local controller is configured to control at least one light fixture of the first set of one or more light fixtures with first local digital signals in accordance with the global digital signals and the sensor signals;
a second local controller coupled to the modular cable and having as inputs control signals from the first local controller, wherein the second local controller receives the global digital signals from the first local controller that configure the second local controller in an operational state, and transmits second local digital signals to the first local controller, and wherein the second local controller controls a second set of one or more light fixtures in accordance with at least the global digital signals;
a switch that is configured to send digital signals to at least one light fixture of the first set of one or more light fixtures and override the local digital signals; and
a modular connector for connecting the switch to the modular cable;
wherein the modular cable connects to the at least one light fixture of the first set of one or more light fixtures to provide power and to control the operation of the at least one light fixture.

34. An adaptive lighting control system, comprising:
power control equipment to supply power to at least one zone of lighting, wherein each zone of lighting of the at least one zone of lighting comprises a first set of one or more light fixtures comprised of one or more lights;
a first local controller associated with each zone of lighting of the at least one zone of lighting;
a global controller in communication with the first local controller and a timing device, wherein the global controller controls power supply to each zone of lighting of the at least one zone of lighting, and wherein the global controller is programmed to direct the first local controller to:
associate a time-out period with each zone of lighting, the time-out period is restarted each time a light control is activated;
associate two states with each zone of lighting with associated start times and stop times on the timing device, wherein:
in a first state of the two states the first local controller turns on at least one light in a zone when a first light control associated with the zone is activated, and turns off the at least one light in the zone either when the first light control in the zone is deactivated or when a stop time for the first state occurs, and
in a second state of the two states the first local controller turns on the at least one light in the zone when a second light control associated with the zone is activated, and turns out the at least one lights in the zone either when the second light control in the zone is deactivated or when the time-out period associated with the zone expires, and
the first local controller adjusts the start times and the stop times associated with the two states for the zone based on activation of the first light control or the second light control;
a second local controller in communication with the first local controller, wherein the second local controller receives global control signals from the first local controller that configure the second local controller in a first operational state and conveys first local control signals to the first controller, and wherein the second local controller controls at least one light fixture in accordance with the global control signals; and a third local controller in communication with the second local controller, wherein the third local controller receives the global control signals from the second local controller and conveys second local control signals to the second local controller, wherein the global control signals configure the third local controller in a second operational state.

* * * * *